United States Patent
Smith

(10) Patent No.: US 7,130,255 B2
(45) Date of Patent: Oct. 31, 2006

(54) METHOD OF CD/DVD VIBRATION DETECTION BY MONITORING MOTOR CONDITIONS

(75) Inventor: Michael G. Smith, Tustin, CA (US)

(73) Assignee: Gateway Inc., Irvine, CA (US)

( * ) Notice: Subject to any disclaimer, the term of this patent is extended or adjusted under 35 U.S.C. 154(b) by 364 days.

(21) Appl. No.: 10/126,175

(22) Filed: Apr. 19, 2002

(65) Prior Publication Data

US 2003/0198157 A1     Oct. 23, 2003

(51) Int. Cl.
*G11B 7/00* (2006.01)
(52) U.S. Cl. .................. 369/53.3; 369/47.44
(58) Field of Classification Search ............. 369/53.3, 369/53.37, 47.39, 47.44
See application file for complete search history.

(56) References Cited

U.S. PATENT DOCUMENTS

| | | | | |
|---|---|---|---|---|
| 3,657,660 | A * | 4/1972 | Pfersch | 327/77 |
| 3,719,873 | A * | 3/1973 | Graf | 318/798 |
| 4,930,064 | A * | 5/1990 | Tanaka et al. | 363/161 |
| 5,495,465 | A | 2/1996 | Arisaka | 369/124 |
| 5,539,267 | A | 7/1996 | Fan et al. | 310/309 |
| 5,557,183 | A | 9/1996 | Bates et al. | |
| 5,636,193 | A * | 6/1997 | Ohmi | 369/53.42 |
| 5,710,491 | A * | 1/1998 | Takagi et al. | 318/116 |
| 5,808,990 | A * | 9/1998 | Summers | 369/53.2 |
| 5,862,113 | A | 1/1999 | Tsuyuguchi et al. | 369/50 |
| 5,898,283 | A * | 4/1999 | Bennett | 318/254 |
| 5,982,725 | A | 11/1999 | Kubo et al. | 369/50 |
| 6,081,491 | A * | 6/2000 | Ota et al. | 369/53.28 |
| 6,097,680 | A | 8/2000 | Yen et al. | 369/50 |
| 6,259,661 | B1 * | 7/2001 | Suekuni | 369/47.44 |
| 2002/0105877 | A1 * | 8/2002 | Kajino et al. | 369/53.18 |

FOREIGN PATENT DOCUMENTS

| | | | |
|---|---|---|---|
| EP | 0 651 388 A2 | 10/1994 | 19/247 |
| EP | 0 651 388 B1 | 10/1994 | 19/247 |

* cited by examiner

*Primary Examiner*—Brian E. Miller
*Assistant Examiner*—Peter Vincent Agustin
(74) *Attorney, Agent, or Firm*—Scott Charles Richardson; McGrath, Geissler, Olds & Richardson, PLLC

(57) ABSTRACT

This invention describes a method and apparatus to determine a safe rotational speed for a CD/DVD drive by detecting the amount of vibration of the disk by measuring the operating conditions of the spindle motor. A disk drive includes a motor for rotating the disk and an apparatus for monitoring the current or back emf in the windings of the motor. When the current or the back emf varies from a normal level, the disk is vibrating and a signal indicating a vibration condition is sent to the spindle motor driver. The maximum speed that the disk rotated is slowed until a vibrating condition is no longer detected and the rotational speed associated with a particular disk is based dynamically on the amount of vibration detected. Disks may also be identified that cannot spin a minimum rate of speed.

8 Claims, 5 Drawing Sheets

METHOD OF CD/DVD VIBRATION DETECTION BY MONITORING MOTOR CONDITIONS

FIELD OF THE INVENTION

The present invention relates to the field of mass storage devices. More particularly, this invention relates to disk drives that use a plastic medium such as CD, CD-ROM and DVD drives.

BACKGROUND OF THE INVENTION

One of the key components of any computer system is a place to store data. Computer systems have many different places where data can be stored. One common place for storing massive amounts of data in a computer system is on a disk drive, such as a CD-ROM or DVD. The most basic parts of a disk drive are a plastic disk that is rotated, an actuator that moves a transducer to various locations over the disk, and electrical circuitry that is used to write and read data to and from the disk. Some of these drives have read only memory. Others can read the read only memory media and are capable of writing as well. The disk drives also include circuitry for decoding information read from the disk into data so that it can be successfully retrieved from the disk. For writable media, the disk drives also include encoders for encoding the data to a form that can be written to the disk surface so that the data can be retrieved at a later date. A microprocessor controls most of the operations of the disk drive as well as passing the data back to the requesting computer and taking data from a requesting computer for storing to the disk.

In each type of disk drive, the media, which is in the shape of a disk, spins during reading information representing data from the media. The disk also spins when information representing data is written to the drive. There is a constant push to spin the media faster and faster during either the read or write operation so that time required to access data from the disk is shorter or so that the time to write data to the disk is shorter. Some CD-ROM drives and DVD drives spin the media at constant angular velocity. Others vary the spin speeds as a function of the radial position of the data so that the media passes by the transducer at a constant linear velocity. These drives are referred to as constant linear velocity drives and achieve the highest rates of spin when the information representing data is at the outer perimeter of the recording surface. The first CD-ROM drive had a maximum speed of 1×. Current CD-ROM and DVD drives spin at maximum speeds which are multiples of the maximum speed of the 1× CD-ROM drive. Current CD-ROM and DVD drives are 16×, 32×, 40× and 52× which represent the multiple of the original CD-ROM maximum spin speed.

Spinning the disks at higher spin speeds have resulted in problems associated with CD-ROM and DVD drives. An increasing number of broken disks are being found in the high speed CD/DVD drives. Some believe that the disks have disintegrated due to structural defects such as cracks and the like. Another possibility is that the problem is caused when a disk is spinning at a high rate and begins to vibrate on the disk drive spindle.

Analysis of the construction of CD/DVD drives shows that this is a possibility. These disk drives include a disk tray. As the disk tray travels into the drive housing, the motor drive spindle and laser pickup assembly are pivoted up so the motor drive spindle goes through the newly inserted disk. At the same time, an upper spindle body fits over the lower spindle and is held by a magnet in the lower spindle. The result is that the only force holding the disk to the spindle is from the magnet.

If a disk begins to vibrate, at some point the magnet can no longer hold the upper spindle to the lower spindle to retain the disk. When the magnet can no longer hold the vibrating disk, the disk will be released and will spin off of the spindle at a high rate of speed in an uncontrolled direction. It is obvious what happens at this point. The disk slams against the housing and is destroyed. The resulting particles may also lodge within critical mechanisms within the drive and result in ruining the disk drive as well. For example, a plastic portion lodged near a mirror may block the light needed to read from the drive or prevent the mirror movement needed to focus the beam.

Therefore, there is a need for a method and apparatus that can detect vibration in a drive that holds a disk using a magnet having a relatively small force. There is also a need for a method and apparatus that can slow the disk drive in response to a detected vibration condition so as to prevent destruction of the disk in the disk drive.

SUMMARY OF THE INVENTION

This invention describes a method and apparatus to determine a safe rotational speed for a CD/DVD drive by detecting the amount of vibration of the disk by measuring the operating conditions of the spindle motor. A disk drive system includes a base, a spindle for holding a DVD or CD-ROM disk, and a motor for rotating the disk. The disk drive also includes an apparatus for monitoring the current or back emf in the windings of the motor. When the current or the back emf varies from a normal level, the disk is vibrating and a signal indicating a vibration condition is sent to the spindle motor driver. The maximum speed that the disk rotated is slowed until a vibrating condition is no longer detected and the rotational speed associated with a particular disk is based dynamically on the amount of vibration detected. Disks may also be identified that cannot spin a minimum rate of speed.

Advantageously, the method and apparatus detects a vibrating condition in a CD-ROM or DVD drive that holds a plastic disk. When vibration is detected a signal is sent to the controller that slows the speed of the spindle. This also prevents loss of data that may be on the disk. This not only prevents destruction of the disk but also prevents destruction of the disk drive or one of its subsystems. The invention also provides for safer operation of a CD-ROM or DVD disk drive.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
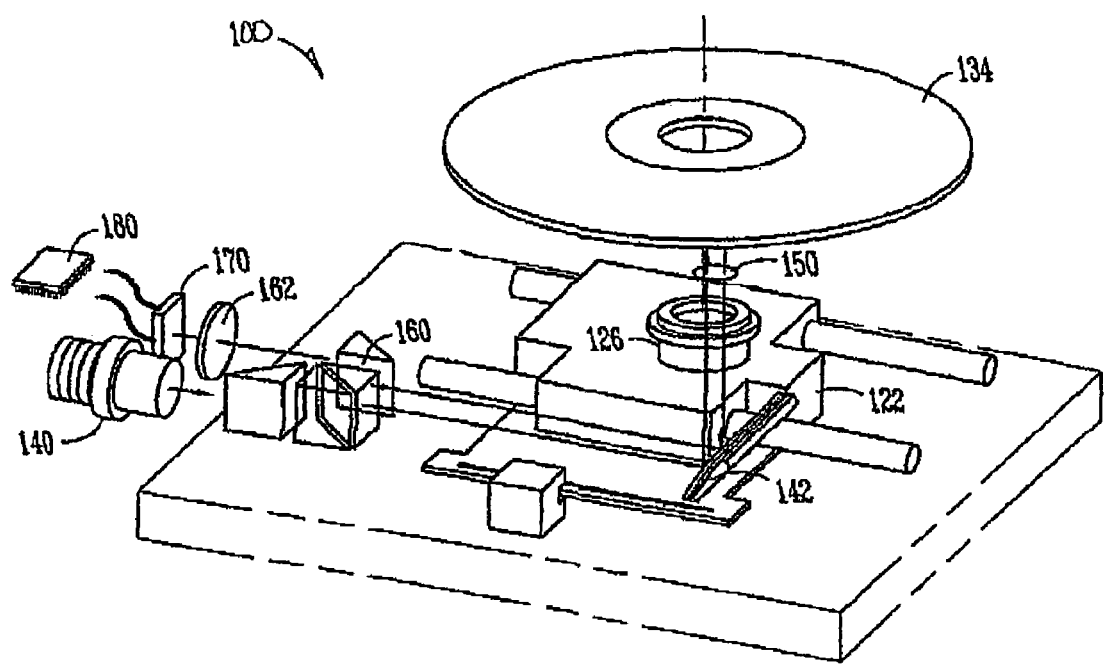
FIG. 1 is an exploded isometric view of a disk drive.

Referring to FIG. 1, the principal electrical and mechanical components of a disk drive 100 constructed in accordance with a preferred embodiment of the present invention are illustrated. The disk drive includes a base 122 and a cover. Attached to the base 122 is a spindle 126. A disk 134 is placed on the spindle 126. A spindle motor 200 (shown schematically in FIG. 2) rotates the spindle 126 and the disk 134. A spindle motor driver 240 controls either the current, the voltage, or both the current and the voltage within the coils of the spindle motor 200 to produce a torque and controllably rotate the spindle 126 and disk 134 attached to the spindle.

A laser diode 140 emits a low-energy infrared beam toward a reflecting mirror 142. A servo motor, on command from a microprocessor (not shown), positions the beam to the correct track on the CD-ROM or DVD by moving the reflecting mirror 142. When the beam hits the disk 134, the light is refracted. The refracted light is gathered and focused through a lens 150 beneath the disk and bounced off the reflecting mirror 142 and sent toward a beam splitter 160. The beam splitter 160 directs the returning laser light toward a second focusing lens 162. The focusing lens 162 directs the light to a photo detector 170 where the light is converted to electrical impulses. The electrical impulses are decoded and subjected to error correction by a channel chip 180 so that information stored on the disk 134 is converted to the data originally stored on the disk 134.

Figure 2:
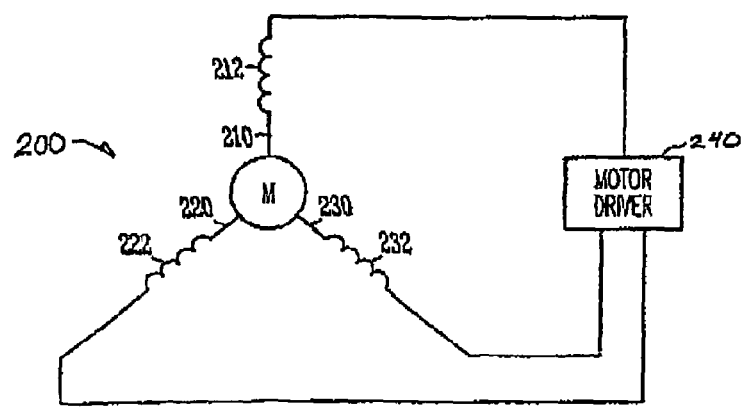
FIG. 2 is a schematic diagram of a three-phase spindle motor used in a disk drive.

FIG. 2 is a schematic diagram of a three-phase spindle motor 200 used in a disk drive 100. The spindle motor 200 includes a first phase 210, a second phase 220, and a third phase 230. Each of the phases are represented by a coil 212, 222, 232. Of course, it should be understood that each of the phases is actually made up of several coils. The motor 200 includes a motor driver 240. The motor 200 can be driven by voltage or by current or by a combination of both current and voltage. The motor driver 240 keeps the current in a current driven motor constant or keeps the voltage in a voltage driven motor constant. Each phase is offset from the other phases so as to keep the rotating portion of the electrical motor spinning smoothly.

Figure 3:
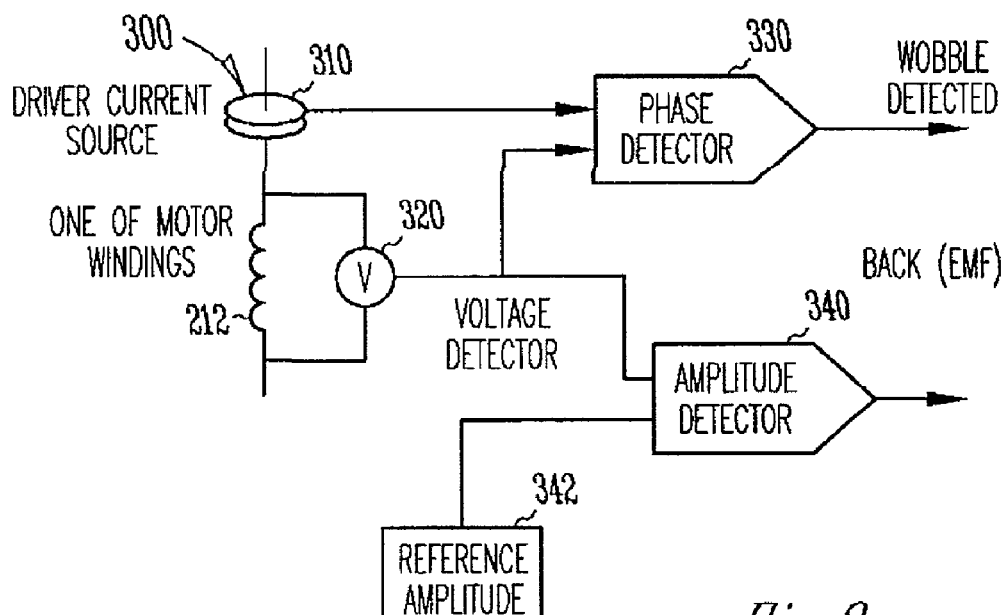
FIG. 3 is a schematic view of the invention showing a voltage driven motor 300.

FIG. 3 is a schematic view of the invention showing a current driven motor 300. A current driven motor has a driver current source 310, and includes a voltage meter 320 placed across one of the motor windings, such as motor winding 212. Thus, the voltage of the motor winding 212 is monitored during operation of the spindle motor 300. The phase of the signal out from the volt meter may be fed into a phase detector 330. The phase of the driver current source may also be fed into the phase detector 330. At the phase detector 330, the phase of the motor winding is compared to the phase of the driver current source. The detector 330 detects a change in a condition of the motor in response to a force on the spindle. The phase of the current from the voltage source is compared to the phase of the current from the current detector to determine a change in force. Generally, the phase of the driver current source and the phase of one of the motor windings will be out of phase, since the motor winding 212 is a coil. However, if the difference between the two phases is beyond a normal range, then generally vibration is detected. In other words, the phase of the voltage across a winding is compared to the phase of the driver current source 310, plus some additive amount of different. The driver current source phase, plus the selected amount of phase difference can be also thought of as a reference phase for detecting vibration or a disk that is vibrating within the disk drive 100. The voltage across one of the motor windings 212 may also be placed into an amplitude detector 340. A reference amplitude 342 is also fed into the amplitude detector 340. When the amplitude of the voltage from the voltmeter 320 is outside a specific or desired range from the reference amplitude 342, a signal is output from the amplitude detector 340 which indicates a vibration of the disk drive or a vibration of the disk 134 on the spindle of the disk drive 100. It should be noted that either both the phase detector 330 and the amplitude detector 340 may be used together, or may be used separately. In other words, one embodiment of the invention shown in FIG. 3 may be only the phase detector, and yet another embodiment of the invention shown in FIG. 3 may include only the amplitude detector and not the phase detector. The reference amplitude 342 may be from any number of sources, including the voltage associated with other windings, 222, 232 of the electrical motor. Using the volt meter 320, measured across at least one of the windings 212, is a measure of the back electromotive force, or back EMF of the motor 300 which includes a driver current source 310.

Figure 4:
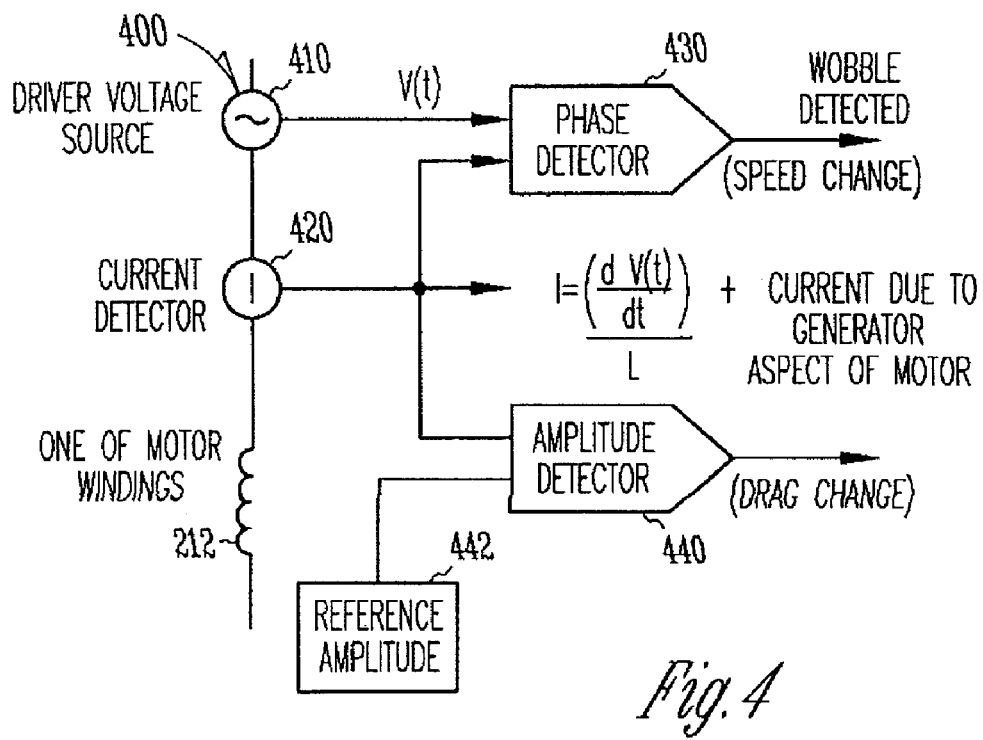
FIG. 4 is a schematic view of the invention showing a current driven motor.

FIG. 4 is a schematic view of the inventions showing a voltage driven motor 400. The voltage driven motor includes a driver voltage source 410 and a current detector or ammeter 420, which measures the amount of current within one of the motor windings 212. The current within the winding 212 is detected by the current detector 420, and output to a phase detector 430. The phase of the driver voltage source is also input to the phase detector 430. When the phases of the output of the current detector or ammeter 420 varies from the phase of the driver voltage source 410 within a selected range, the phase detector 430 outputs a signal indicating that vibration has been detected. Furthermore, the output from the ammeter 420 can be fed to an amplitude detector 440. A reference amplitude 442 is also fed into the amplitude detector. When the differences between the amplitude of the current within one of the motor windings 212 is different from the reference amplitude 442 by a selected amount, the amplitude detector outputs a signal indicating that vibration has been detected. In essence, the amplitude detector detects when a drag change occurs within the electrical motor 400. It should be noted that the reference amplitude 442 could be a selected reference amplitude, or the average amplitude of all the phases or all the motor windings 212, 222, 232. It should be noted that in FIG. 4, both a phase detector 430 and an amplitude detector 440 are shown. It should be noted that both are not actually needed, and one embodiment might include not having a phase detector 430, and only an amplitude detector comparing the amplitude of the measured current from ammeter 420 with a reference amplitude 442. Another embodiment would be to have the phase detector 430 and not have the amplitude detector 440. Thus there are actually three embodiments shown, one in which both phase detector 430 and the amplitude detector 440 are used, and another where only the phase detector 430 is used, and another where only the amplitude detector 440 is used.

Figure 5:
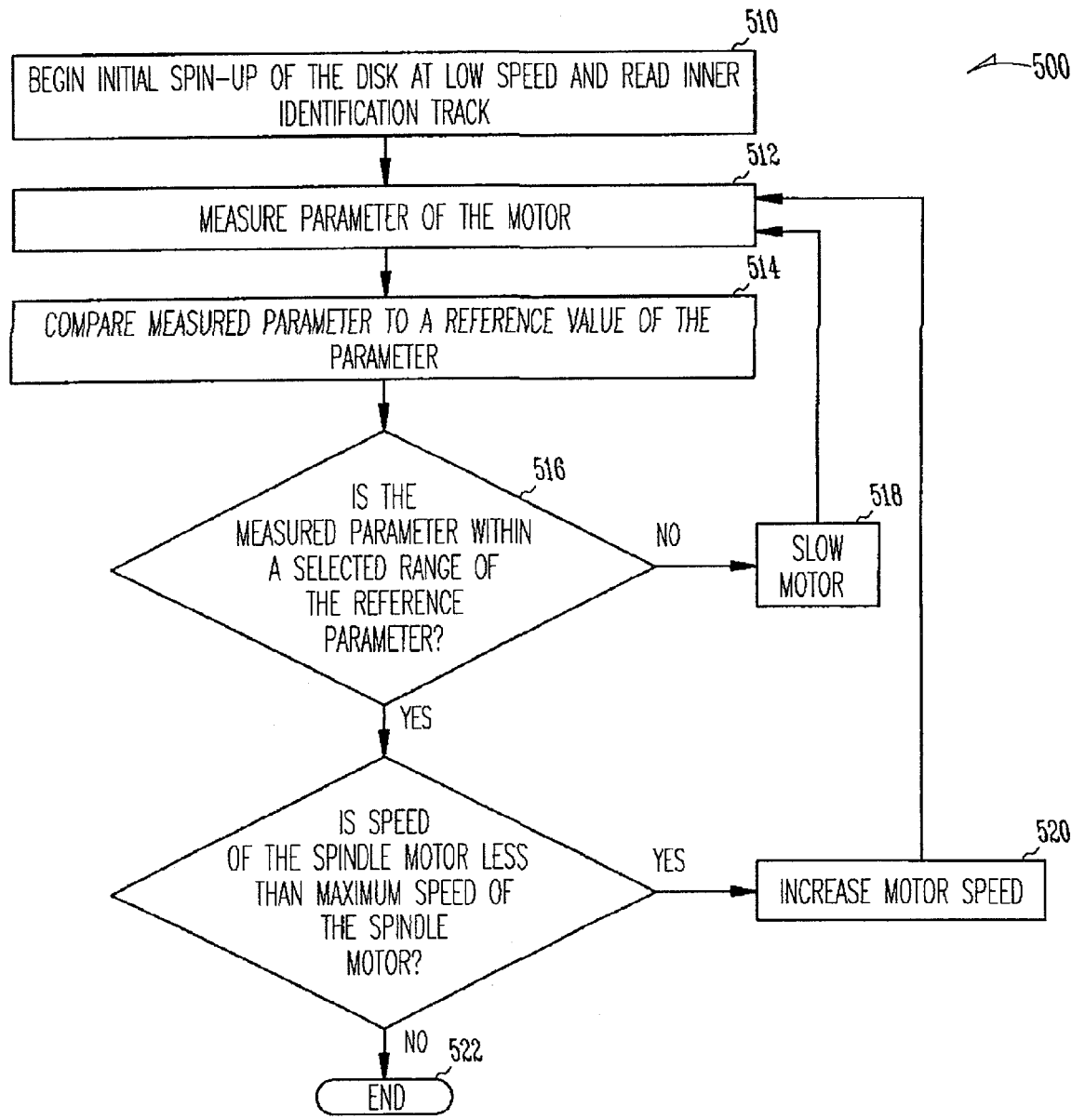
FIG. 5 is a flow chart showing various steps associated with a first embodiment of the invention.

Once vibration has been detected, a signal from either a phase detector or an amplitude detector which indicates a vibration is sent to a motor controller. The motor controller will slow the motor down, or at least change the speed of the motor until vibration is no longer detected. FIG. 5 is a flow chart showing the various steps associated with embodiments of the invention shown in FIGS. 3 and 4. FIG. 5 begins by an initial spin-up of the disk drive 100 at a low speed. The inner identification track on the disk 134 is read, as depicted by reference numeral 510. A parameter of the motor is then measured, as depicted by reference numeral 512, and the measured parameter is compared to a measured reference value of the parameter, as depicted by reference numeral 514. Then it is determined whether the measured parameter is within a selected range of the reference parameter, as depicted by decision box 516. If the measured parameter is not within the selected range of the reference parameter, this generally indicates that a vibration condition has been detected, so therefore the motor is slowed, as depicted by reference numeral 518. And then the parameter of the motor is then measured, as depicted by reference numeral 512. If the measured parameter is within the selected range of the reference parameter, then it is determined whether of not the speed of the spindle motor is less than the maximum speed of the spindle motor. If the speed of the spindle motor is less than the maximum speed of the spindle motor, the motor controller increases the motor speed, as depicted by reference numeral 520, and then the parameter of the motor is measured, as depicted by reference numeral 512, and steps 512, 514, and 516 are repeated. If the speed of the spindle motor is not less than the maximum speed of the spindle motor, then the process is over, and the process is ended, as depicted by reference numeral 522.

Figure 6:
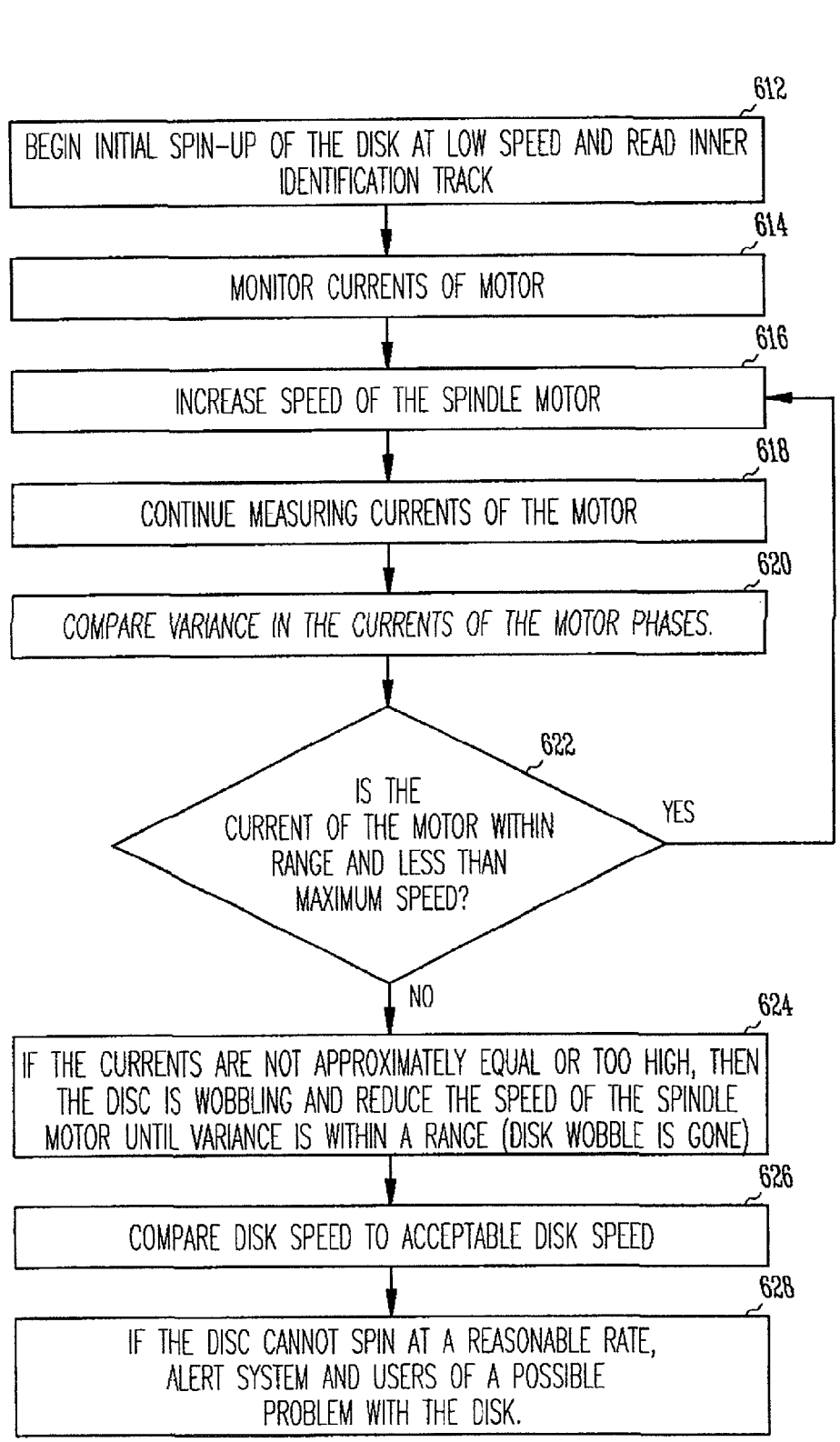
FIG. 6 is a flow chart showing various steps associated with a second embodiment of the invention.

FIG. 6 is a flowchart showing the various steps associated with another embodiment of the invention. This is a specific process 600, and begins by initial start of the disk at a low speed, and reading of the inner identification track, as depicted by reference numeral 612. The monitor then the currents of the motor, and specifically the currents of the various phases of the motor, are monitored as depicted by reference numeral 614. The speed of the spindle motor is increased, as depicted by reference numeral 616, while continuing to measure the currents in the various phases of the motor, as depicted by reference numeral 618. The variance among the currents in the various motor phases are then compared, as depicted by reference numeral 620. The next step is a decision box, which determines whether the current of the phases within the motor are all within range of one another, and if the motor is less than the maximum speed, as shown by reference numeral 622. If the current of the phases of the motor are within the range and the motor is operating at less than the maximum speed, then the process returns to step 616, where the speed of the spindle motor is increased, and steps through the process steps leading up to decision box 622. If the current of the motor is not within the range, or is less than the maximum speed, then the disk is vibrating and the motor controller is commanded to reduce the speed of the spindle until the variance is within range, as depicted by reference numeral 624. Once the process is completed such that the vibration is gone, or such that the phases of the currents in the spindle motor are within a range of variance, the achieved disk speed is compared to an acceptable disk speed, as depicted by reference numeral 626. If the disk cannot spin at a reasonable rate, then an alert is sent to the users, as well as to the computer system, of a possible problem with the disk, as depicted by reference numeral 628.

Advantageously, the method and apparatus detects a vibrating condition in a CD-ROM or DVD drive that holds a plastic disk. When vibration is detected a signal is sent to the controller which slows the speed of the spindle. This also prevents loss of data that may be on the disk. This not only prevents destruction of the disk but also prevents destruction of the disk drive or one of its subsystems. The invention also provides for safer operation of a CD-ROM or DVD disk drive.

Figure 7:
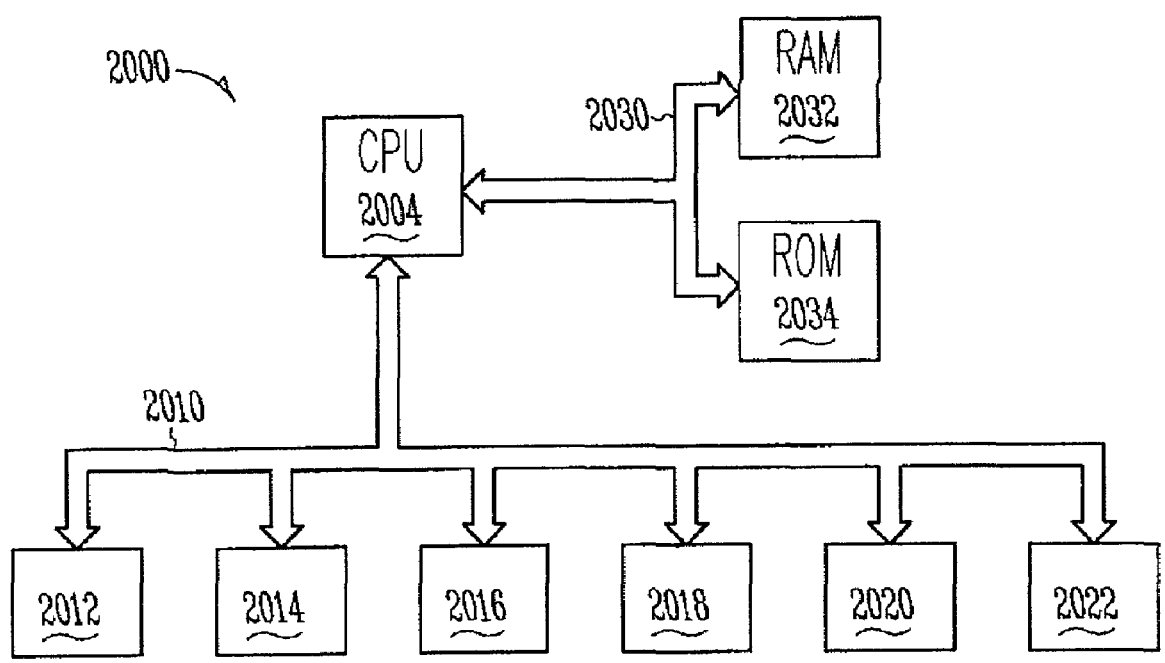
FIG. 7 is a schematic view of a computer system.

FIG. 7 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2000 includes a magneto-optical device which includes the cooling mechanism or heat removal mechanism described above. The information handling system 2000 may also include an input/output bus 2010 and several devices peripheral devices, such as 2012, 2014, 2016, 2018, 2020, and 2022 may be attached to the input output bus 2010. Peripheral devices may include hard disk drives, magneto-optical drives, floppy disk drives, monitors, keyboards and other such peripherals.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for detecting an abnormality in the operation of a disk drive having a three-phase motor driving a spindle and having a disk attached to the spindle, the method comprising:
   driving the motor at a selected speed;
   monitoring an electrical phase parameter of at least one phase of the three-phase motor;
   comparing the monitored electrical parameter to a reference value for the monitored electrical parameter;
   changing the selected speed for driving the motor when the monitored electrical parameter of the motor is beyond the reference value indicating a vibration condition; and
   wherein said vibration condition originates as the disk begins to vibrate on the spindle.

2. The method of claim 1 wherein the electrical phase parameter monitored is the phase of the voltage.

3. The method of claim 2 wherein the reference value is the phase of the motor.

4. The method of claim 1 wherein the electrical phase parameter monitored is the phase of the current.

5. The method of claim 4 wherein the reference value is the phase of the motor.

6. The method of claim 1 wherein the step of monitoring an electrical phase parameter of at least one phase of the three phase motor further comprises capturing the electrical phase parameter directly from the at least one phase of the three phase motor.

7. The method of claim 1, wherein said vibration condition is a vibration condition of the spindle.

8. The method of claim 7, wherein said vibration condition is due to a physical vibration of a disk on the spindle.

* * * * *